(No Model.)  2 Sheets—Sheet 1.
E. THOMSON.
REGULATOR FOR DYNAMO ELECTRIC MACHINES, MOTORS, &c.
No. 353,180. Patented Nov. 23, 1886.
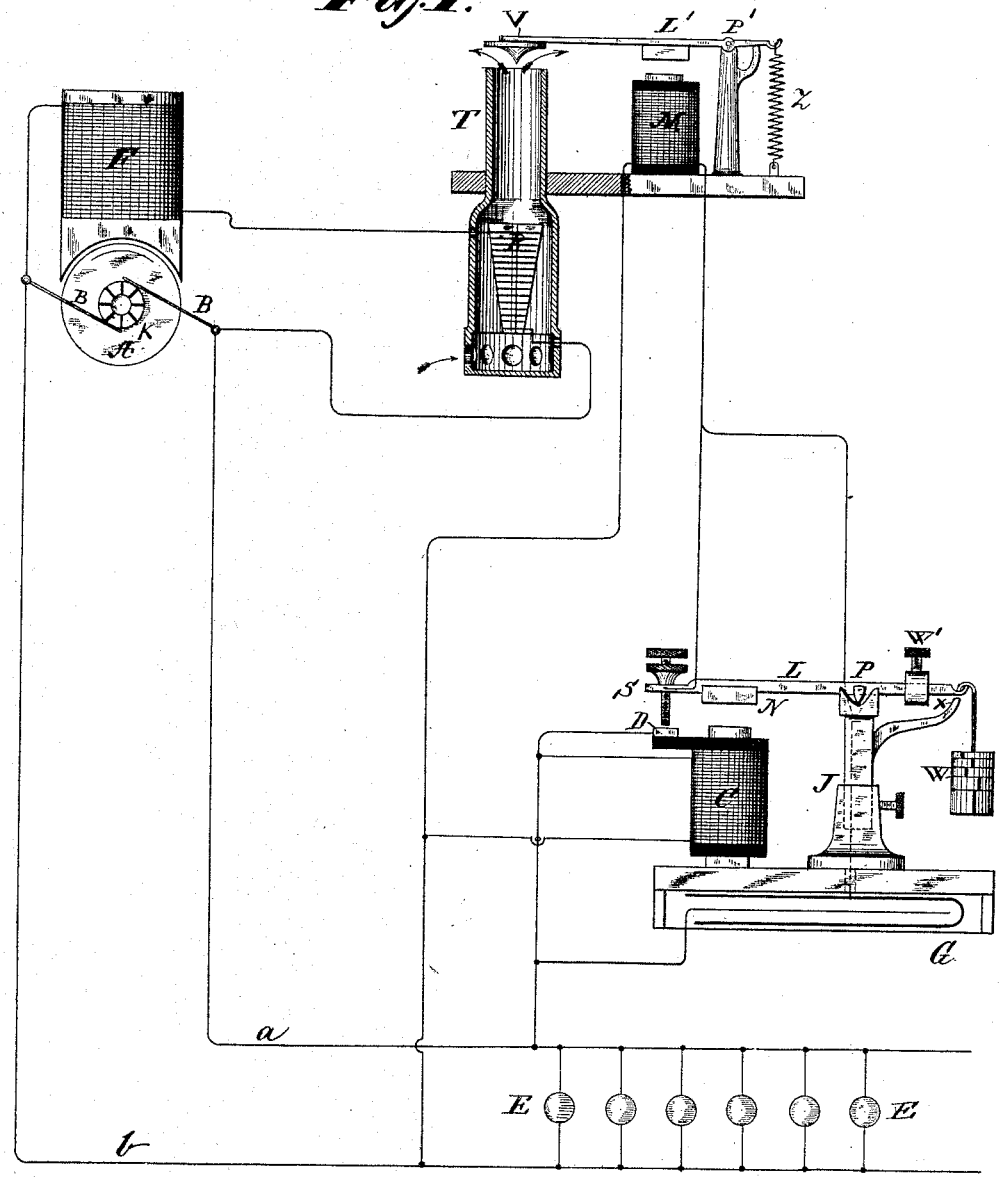
WITNESSES:
INVENTOR
Elihu Thomson.
BY
ATTORNEY (No Model.) 2 Sheets—Sheet 2.
E. THOMSON.
REGULATOR FOR DYNAMO ELECTRIC MACHINES, MOTORS, &c.
No. 353,180. Patented Nov. 23, 1886.
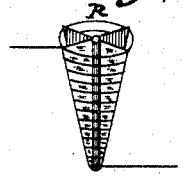
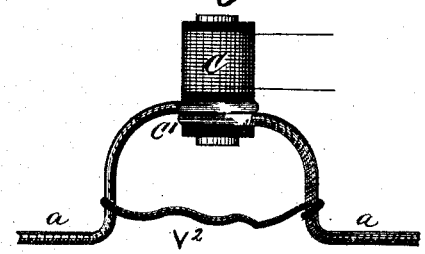
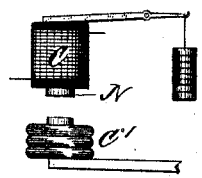
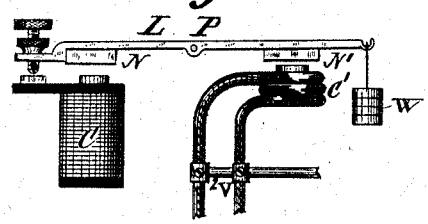
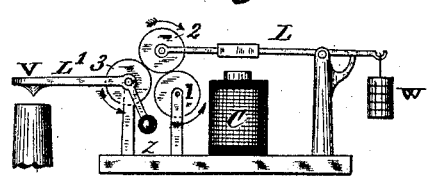
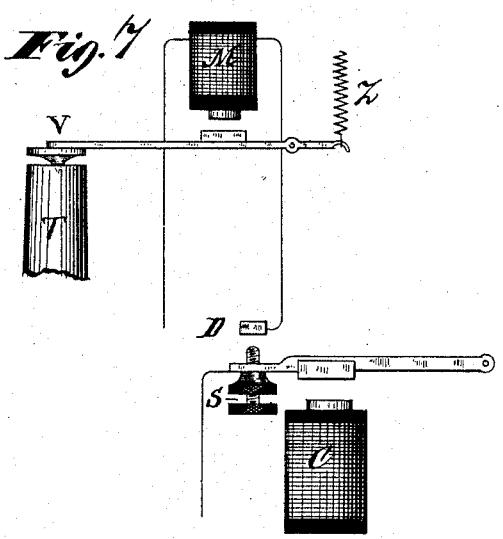
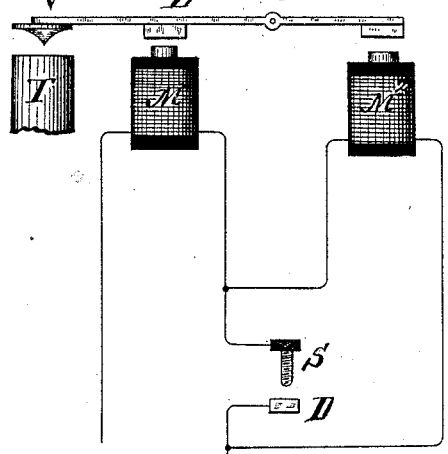
WITNESSES:
Gabriel J. W. Gabler.
Wm. H. Capel
INVENTOR
Elihu Thomson.
BY
H. C. Townsend
ATTORNEY

UNITED STATES PATENT OFFICE.

ELIHU THOMSON, OF LYNN, MASSACHUSETTS.

REGULATOR FOR DYNAMO-ELECTRIC MACHINES, MOTORS, &c.

SPECIFICATION forming part of Letters Patent No. 353,180, dated November 23, 1886.

Application filed June 10, 1886. Serial No. 204,780. (No model.)

*To all whom it may concern:*

Be it known that I, ELIHU THOMSON, a citizen of the United States, and a resident of Lynn, in the county of Essex and State of Massachusetts, have invented certain new and useful Regulators for Dynamo-Electric Machines, Motors, &c., of which the following is a specification.

The object of my present invention is to provide a thoroughly reliable and efficient regulator, designed more particularly for application to dynamo-electric machines and for use under those conditions where it is desirable to maintain a certain electro-motive force or constant difference of potential between the terminals of the machine, irrespective of changes of speed of the armature or in the number of lights or other working devices operated by the current of said machine.

The invention is intended more especially for application to shunt-wound dynamos feeding incandescent lamps or other working apparatus in multiple arc. It may also be applied to compound-wound dynamo-machines, so as to compensate for the increase of electro-motive force due to increases in speed of the driving-power.

My invention consists of four different parts in combination—to wit: first, a controller-magnet properly connected to the electric circuit so as to be sensitive to changes of electrical condition thereon; second, a motor device consisting of either a motor, electro-magnet, or a mechanical motor controlled by said magnet, which device is governed in its action by the controller-magnet; third, a variable resistance connected to the dynamo-machine in such way as to control the generating capacity of the same, and composed of a material whose resistance varies with changes of temperature; fourth, suitable means for governing the temperature of said resisting-coil, said means being operated by the motor device.

The artificial resistance employed in my invention is the same in principle as that described in another application for patent filed by me of even date herewith, Serial No. 204,779. It consists, essentially, of an electric conductor composed of a material whose resistance varies with the temperature of said conductor, and combined with which is a means for varying the temperature of said conductor—such, for instance, as a cooling or heating current of air or other fluid controllable by manual or automatic devices.

In my application just referred to I have shown the adjustable resistance as contained in a non-conducting casing, through which the air is made to circulate by the heat developed in the conductor itself when a current of electricity passes through the same, and in combination with such casing a valve for controlling the flow of the air so as to determine the extent to which the conductor shall become heated. I have also described in said application equivalent means for controlling the temperature of said conductor, and consisting, essentially, of a jet of a heating or a cooling fluid whose effects on the conductor may be varied either by throwing the jet on or off the conductor to a greater or less extent, or by governing the amount of heat or cooling fluid delivered from the jet.

In my present application I have, for the sake of simplicity, confined my description to that particular form of adjustable rheostat or resistance in which the conductor is contained in a closed case and a valve is employed for governing the flow of air through said case. The conductor may be either a substance or metal—such as iron or platinum—whose resistance increases with an increase of its temperature or may be a material—such as carbon—whose resistance decreases with an increase of temperature.

The controller-magnet of my invention, when used with a dynamo supplying lamps or other devices in multiple arc, is properly connected to the mains, so as to be sensitive to small variations in the difference of potential between said mains. I prefer to make such controller-magnet act as an electric relay to throw into and out of action the motor-magnet, though it may be employed to operate a device that acts mechanically to throw into action a mechanical power acting on the devices for varying the temperature of the conductor whose resistance varies with changes of temperature. The adjustable resistance is preferably placed in the circuit with the field-coils of the machine where such coils are in a derived circuit to the work.

In the accompanying drawings, which form a part of this specification, Figure 1 is a diagram illustrating the invention as applied to an ordinary shunt-wound dynamo-machine. Fig. 2 illustrates the preferred way of mounting the adjustable resistance-coil so as to expose it more thoroughly to the effects of the cooling-current of air. Fig. 3 shows a controller-magnet adapted more especially for use with certain kinds of compound-wound dynamo-machines. Figs. 4 and 5 illustrate modifications of the principle indicated in Fig. 3. Fig. 6 illustrates the manner of controlling the mechanical motor—such as a clock-work or wheel-work, when such is employed for the motor-magnet of Fig. 1. Figs. 7 and 8 illustrate modifications in the arrangements and connections of the motor-magnet and the controller-contacts.

Referring to Fig. 1, the parts of any shunt-wound dynamo are indicated as follows:

F indicates the coils of the field-magnet placed in derived circuit to the work, consisting of electric lamps or other devices, E E, fed in multiple arc from the mains $a\ b$.

A is the armature of the machine; K, the commutator-cylinder, and B B the brushes connected to the mains and to the circuit of coils F, as indicated.

In the circuit of coils F is included the adjustable resistance, composed of a coil or conductor whose resistance changes with changes of temperature. Such a coil is indicated at R, and forms a considerable fraction of the total resistance in the branch or derived circuit, including F and R.

T indicates an inclosing tube or chimney surrounding the resistance R, and preferably lined with a non-conductor of heat—such as plaster, asbestus, clay, or a mixture of such materials—or otherwise constructed so as to guard against lateral escape and conduction of heat. This case is formed with a number of openings at its bottom, through which air may enter, and at its top has an opening controlled by a suitable valve, V, operated by the motor device of my invention.

In the present instance the motor device is shown as composed of an electro-magnet, M, whose armature is carried by a lever, L', pivoted at P', and having a suitable retracting-spring, Z. The valve controls the draft of air through the chimney T, produced by the heat developed in the coil R, and according to the draft determines the temperature that the coil R shall attain by the agency of the heating effects of current passing through it. If the conductor R is of carbon, which decreases in resistance with an increase of temperature, the valve V should be arranged so as to close the opening at the top of chimney T when a decrease of resistance is required, instead of opening it, as would be required if the conductor R is formed from a metal such as platinum, so as to require to be cooled to produce a similar effect.

In the description which follows it is assumed that iron or other substance is employed for the conductor R, which increases in resistance considerably with an increase of temperature. If a material having the opposite characteristic is used, it would only be necessary to reverse the cycle of operations at some one of its stages, as is obvious.

The magnet M is preferably energized from the mains $a\ b$, as indicated, and under such conditions of use would naturally be of considerable resistance. At the same time, however, it will be understood that such magnet might be energized by current derived from any source separate from that supplying the current to the mains $a\ b$.

The circuit of the electro-magnet M is controlled by contacts operated by the controller-magnet C of my invention. The controller-contacts are formed of a stop or contact, D, as shown, and a contact-screw, S, preferably made adjustable and mounted on the lever L, which carries the armature N of the electro-magnet C. The contact D is connected to one of the mains, as, for instance, $a$, and the contact S is connected through the electro-magnet M with the other main, $b$. I prefer to employ, in conjunction with these devices, a condenser, G, for preventing spark at the contact D on the opening of the circuit of magnet M. The two poles of the condenser are connected, respectively, to the upper and lower contacts, or to their connecting-wires, as indicated in the figure. The electro-magnet C is also connected in one of the branches, between the mains $a\ b$, so that it will feel any changes in the conditions of potential between the mains $a\ b$.

The armature-lever L is mounted on knife-edge bearings, (indicated at P,) and is supported on a pillar, J. The pull of the magnet is counterbalanced by a variable weight, W, which is hung so as to avoid friction on the bearings of the lever, and which is preferable to a retractile spring on account of its constancy. It is desirable to provide, also, a rider-weight, W', which can be moved to effect small adjustments of counterpoise.

Assuming an adjustment to be made so that there will be a balance when the electro-magnet C is energized to normal amount, and that the screw S is set so as to act in conjunction with the back stop, X, of the lever to permit a small play at the controller-contacts, it will be evident that any very slight variation in the difference of potential between the mains $a\ b$ will cause an increase or decrease of power of the magnet C, which will be attended by a closing or opening of the contact at D. By the action of the controller-contacts D S, the magnet M is thrown into or out of action, and from this there results a change of resistance through a closing or opening of the valve V, with a consequent heating or cooling of the resistance R as the cooling draft of air is cut off or re-established by the operation of the valve.

An increase in the temperature of the resistance R, produced by closing the valve, results in introducing greater resistance to the flow of current in the field-circuit, including coils F, and therefore diminishes the power of the field-magnet of the machine, while conversely the lowering of the temperature of R through the establishment of the cooling-air draft results in greater power of the field-magnet. These changes in the field-magnet, as well understood in the art, change the generating capacity of the machine and the difference of potential between the two mains $a\ b$. In practice there is a vibration of the parts resulting in the maintaining of such a temperature in the coil R through vibration of the valve as to secure a constant electro-motive force or constant difference of potential between the mains $a\ b$.

In the normal action of the device a frequent closure and opening of the contacts at D take place, which, as obvious, are accompanied by movements of the valve V. If an increase of the speed of the armature A should occur, there would be a temporary increase in the electro-motive force, since the increased power of magnet C, resulting from such action, would close the controller-contact D and hold it closed. Valve V would, therefore, be kept closed, and the resistance R would increase by increase of temperature, thus cutting down the field F and restoring the potential to normal, after which the vibratory actions just described would be resumed. A diminution of speed would give temporarily a low potential, since the power of C would decrease, allowing the contacts D S to remain open until, through the continued opening of the valve V and the cooling of the resistance R, the strength of the field-magnet is increased so as to raise the potential on the mains to normal, whereupon the vibratory state is again resumed. The coils of controller-magnet C must of course be of such high resistance as to prevent injurious heating during use.

It will be obvious that the valve V may be made to close through the action of the spring Z, and the magnet M made to act so as to tend to open the valve. In this case the contacts of the controller-magnet must be reversed in position so that the magnet M will be thrown out of action when the power of the controller-magnet increases, and will be thrown into action when its power decreases. Such a modification I have indicated in Fig. 7. It is likewise obvious that the same effect produced by retractor Z could be produced by the employment of a second magnet thrown into action when the magnet M is cut out. Such an arrangement is indicated in Fig. 8, where the second magnet is indicated at $M^2$, and is arranged to be shunted by the controller-contacts, so that on the throwing out of the magnet M by the breaking of the contact the magnet $M^2$ will be simultaneously thrown into action through the breaking of the shunt around it. Other modifications can be made without departing from the principle of my invention.

The magnet M and its retractor are simply typical of any motor devices controllable by the operation of sensitive magnet—such as the controller-magnet C—and whose function is to do the heavier work, or work demanding a large range of movement of the parts.

I prefer to mount the resistance-coil R in the manner indicated in Fig. 2, so as to expose all its parts more effectively to the action of the current of air or gas that affects its temperature. This result is secured by mounting the coil on the tapering frame, as indicated, so that its successive turns will be displaced laterally and will not shield one another from the current. The frame is preferably constructed of tapering wings, formed of a non-conductor—such as mica—and supported at their inner edges in a metal or plaster stem. At the outer edges of the wings suitable notches are cut for the reception of the iron or platinum wire making up the coil.

In applying my regulator to the shunt field-coil of a compound-wound dynamo, wound to to give a constant difference of potential, no modifications are necessary; but where the dynamo-machine is wound so as to give an increase of potential at its terminals when the load is increased, as is the case with machines which are properly wound to compensate for a drop of potential in the mains on an increase of load, the controller-magnet C should be wound additionally with a coil, C', in the main circuit of the machine, or a portion of such main circuit. The main circuit-coil would consist of a few turns of coarse wire, as indicated at Fig. 3, placed in the main $a\ a$, leading from the armature of the dynamo. The coils C C' thus applied should be wound differentially. As it is very difficult to determine the exact magnetic effect required of the coils C', it is preferable to shunt such coils with a wire, $V^2$, whose effective conducting length may be varied, so as to determine the effective action of the coils C'.

The coils C, Fig. 3, are connected after the manner indicated in Fig. 1, so as to be sensitive to changes in the difference of potential, and the magnetic effects of such coil are opposed by the action of the coils C'.

In order to produce the proper operation of the regulator, it is obvious that the resultant of the effects of the two coils must be such that the armature N, operating the controller-contacts, will vibrate during the existence of the normal difference of potential of either light load or little current in the mains, or heavy load or maximum current in the main. It is of course not essential that the windings C C' be upon the same core, as all that is necessary is that they should oppose each other's actions so far as the controller-lever L is concerned.

Modifications in the arrangements are indicated in Fig. 4, where the coils act on opposite sides of the pivot P for the lever, and in Fig. 5, where one, as, for instance, C, is wound on the armature for the other, as C'.

In Fig. 6 one of the numerous motor devices which may be used in place of the motor-magnet M, Fig. 1, is illustrated. The controller-lever L, instead of operating on controller-contacts, moves the wheel 2, consisting of a friction roller or clutch, in such way as to bring it into or out of contact with two other rollers, 1 3, simultaneously. One of the rollers, as, for instance, 1, is revolved continuously by any suitable power, and the other, 3, is maintained on a shaft, from which extends an arm, L', carrying the valve V. The counterpoise Z, attached to the lever, tends to open the valve, while the roller 2, when driven by the roller 1, revolving in the direction of the arrow, turns the wheel 3 in a direction to close the valve. The results effected are obviously the same as those secured by the arrangements shown in Fig. 1.

What I claim as my invention is—

1. In an electric regulator, the combination, substantially as described, of a field-magnet coil upon whose degree of excitation the action of the machine depends, an artificial resistance connected to the same and formed of a material whose specific resistance varies with changes of temperature, controlling devices external to the coil itself for governing or controlling the temperature, motor devices for operating such controlling devices, and a controller-magnet governing the motor devices, as and for the purpose described.

2. The combination, in an electric regulator, of a field-magnet coil upon whose degree of excitation the potential of current developed depends, a conductor connected with the circuit of the same and formed of a material whose resistance varies with changes of temperature, means for governing the temperature of said conductor, a controlling or operating motor, and a governing-magnet sensitive to changes in the potential of the current to be governed.

3. The combination, in an electric regulator, of a shunt field-magnet coil, a conductor in the circuit thereof formed of a material whose resistance varies with changes of temperature, means for governing the temperature of said conductor independently of the exciting-current flowing to the field-magnet coils, an operating-motor device, and a controller-magnet connected to the mains, as described, so as to be sensitive to changes in the difference of potential between said mains.

4. The combination, with a dynamo-machine and working devices in multiple arc, of a field-magnet coil in a shunt to the working devices, a resistance-coil in the circuit to the field-magnet coil, a tube inclosing such resistance-coil, a valve controlling a passage of a cooling-current through a tube, a motor device for operating said valve, and a controlling-magnet connected to the mains in multiple arc with the working resistances.

5. The combination, with a dynamo-machine supplying working resistances in multiple arc, of means such as an electro-magnet responsive to changes in the difference of potential in the mains, a motor device controlled by said electro-responsive devices, a resistance connected to the circuit of a field-magnet coil, and means for controlling the temperature of said coil so as to vary its specific resistance according to the amount of current desired in the field-magnet coils, said means being operated by the motor devices.

6. The combination, with the mains $a$ $b$, supplying devices in multiple arc, of an electro-magnet connected in a circuit from one main to the other, an armature-lever, L, balanced on knife-edges, controlling-contacts governed by the same, a motor magnet or magnets governed by said controlling-contacts, and an artificial resistance whose temperature is controlled by the operation of the motor devices, as and for the purpose described.

7. The electric conductor R, formed of material whose resistance varies with changes of temperature, and placed in the path of a cooling-current by which its temperature may be governed, in combination with a tapered frame on which the conductor is wound, as and for the purpose described.

8. The combination, with the resistance-coil R, of a taper-frame consisting of a number of tapering wings of non-conducting material, as and for the purpose described.

9. The combination, with the controller-magnet having coils C in a derived circuit and coils C' in a main circuit, of a variable shunt-wire, $V^2$, as and for the purpose described.

10. The combination, with the controller-magnet C, of controlling-contacts, a motor-magnet, M, an artificial resistance whose resistance varies with changes of temperature, and a valve, V, operated by the motor-magnet and controlling the passage of a cooling-current over the resistance.

Signed at Lynn, in the county of Essex and State of Massachusetts, this 5th day of June, A. D. 1886.

ELIHU THOMSON.

Witnesses:
  M. L. THOMSON,
  M. E. BINGHAM.